United States Patent [19]
McDaniel

[11] Patent Number: 5,205,157
[45] Date of Patent: Apr. 27, 1993

[54] EMPTY CONTAINER LEAK TESTING

[75] Inventor: Patrick K. McDaniel, Pasco, Wash.

[73] Assignee: Seal Integrity Systems, Inc., Richland, Wash.

[21] Appl. No.: 512,752

[22] Filed: Apr. 19, 1990

Related U.S. Application Data

[63] Continuation-in-part of Ser. No. 303,358, Jan. 27, 1989, abandoned, which is a continuation-in-part of Ser. No. 106,229, Oct. 6, 1987, Pat. No. 4,930,342, which is a continuation-in-part of Ser. No. 938,027, Dec. 4, 1986, Pat. No. 4,747,298.

[51] Int. Cl.$^5$ ............................................. G01M 3/02
[52] U.S. Cl. ...................................... 73/49.2; 73/49.8
[58] Field of Search ................ 73/49.2 R, 40, 49.3, 73/52, 45.4, 40.7, 49.8, 49.1, 37

[56] References Cited

U.S. PATENT DOCUMENTS

| | | | |
|---|---|---|---|
| 1,825,744 | 10/1931 | Landrum | 73/52 |
| 2,093,429 | 6/1933 | Foss | 73/52 |
| 2,527,560 | 10/1950 | Maher | 73/49.2 R |
| 3,369,392 | 2/1968 | Christensson | 73/49.2 R |
| 3,423,990 | 1/1969 | Martin | 73/49.2 R |
| 3,431,773 | 3/1969 | Calhoun | 73/49.2 R |
| 3,930,401 | 1/1976 | Filler | 73/49.2 R |
| 3,949,598 | 4/1976 | Bergstrand | 73/49.2 R |
| 3,951,185 | 4/1976 | Bower et al. | 73/49.2 R |
| 3,991,622 | 11/1976 | Oowada | 73/49.3 |
| 4,055,984 | 11/1977 | Marx | 73/49.2 R |
| 4,117,718 | 10/1978 | Hayward | 73/52 |

FOREIGN PATENT DOCUMENTS

| | | | |
|---|---|---|---|
| 1209569 | 3/1960 | France | 73/49.2 R |
| 44325 | 3/1983 | Japan | 73/49.2 R |
| 246648 | 11/1986 | Japan | 73/49.2 R |
| 589548 | 1/1978 | U.S.S.R. | 73/49.2 R |

Primary Examiner—Tom Noland
Assistant Examiner—Michael Brook
Attorney, Agent, or Firm—Wells, St. John, Roberts, Gregory & Matkin

[57] ABSTRACT

Testing apparatus and processes are described for testing containers or selected portions thereof for leaks. The device includes container receivers for receiving a container. A support engages a surface of the container. The support includes a network of rigid support surfaces, preferably a screen shaped by a rigid base to conform to and engage the container surface. Open fluid passageways are interspersed within the network of rigid support surfaces which hold the container against deformation in response to applied pressure differential. A pressure differential across the surface being tested will result in passage of fluid through a leak in the test area. The fluid passageways facilitate free flow of the fluid from one side to the other. Flow of fluid will produce a detectable pressure differential between the two sides, quickly identifiable as a container leak. The support surfaces expand and contract to facilitate placement and removal of the container. A sealed test chamber is provided adjacent one surface of the container being tested. Differential pressure is applied to the test chamber to urge the tested container surface against the rigid support surface and influence fluid flow through the test surface and the open passages to be detected by an appropriate pressure sensor.

43 Claims, 8 Drawing Sheets

EMPTY CONTAINER LEAK TESTING

RELATED APPLICATIONS

The present application is a Continuation-in-Part of U.S. Pat. application Ser. No. 303,358 filed Jan. 27, 1989, now abandoned, which is a continuation-in-part of U.S. patent application Ser. No. 106,229, now U.S. Pat. No. 4,930,342, filed Oct. 6, 1987, which is a continuation-in-part application of U.S. patent application Ser. No. 938,027, filed Dec. 4, 1986, now U.S. Pat. No. 4,747,298 issued May 31, 1988.

TECHNICAL FIELD

The present invention relates to nondestructive testing of containers for leaks, and in particular to pressure testing of open containers.

BACKGROUND OF THE INVENTION

Test methods for determining leaks in empty containers has been accomplished by several methods.

In a first method, the open end of an empty container is sealed and the container is placed in a liquid. Bubbles escaping from the interior of the container indicate a leak. This process may be hastened if a positive gas pressure is applied to the interior of the container. But the pressure cannot exceed certain levels to avoid bursting the container. Also slow, very small leaks may not quickly produce an easily detectable bubble, even under pressures approaching the bursting strength of the container. While partially effective, this process is relatively slow and undesirable for high speed testing purposes.

Another method is to seal the container and place it in a chamber of pressurized fluid. Seepage through a leak will thus occur inwardly through the container and into the container interior where it may be detected by appropriate sensors. Again, the test pressure cannot be elevated beyond the bursting pressure of the container.

In still another method, the container is sealed and placed in a vacuum chamber where the atmosphere about the container is evacuated. Leaks in the container may be detected by pressure change (drop) within the container or by detectable decay of the vacuum in the outer test chamber.

Various other forms of testing processes involving one or more of the above processes or variations thereof have also been employed.

It is understood that increased test pressures will usually result in quicker detection of leaks. However, high test pressures have been avoided to prevent damage to the container. A problem has therefore remained to provide fast yet effective nondestructive leak testing for empty containers and container members.

BRIEF DESCRIPTION OF THE DRAWINGS

The preferred embodiments of the invention are illustrated in the accompanying drawings, in which:

FIG. 7 is a view similar to FIG. 6 only showing the support of the FIG. 6 embodiment in a retracted, container release and receiving orientation;

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

The present device 10 and methods disclosed herein are intended to facilitate non-destructive leak testing in containers 11 such as cans, cups, bottles, bowls, cartons, boxes, trays, etc. Such generic container configurations may include a number of forms of construction and materials. For example, an empty metal container 11 is shown in the drawings. However, the present apparatus will function equally as well with plastic cups or bowls, or open containers of other configuration and construction materials. The present testing device 10 and testing process may also be utilized to test only selected portions of containers or container members. Thus, the container 11 shown in the drawings is simply representative of a wide variety of container configurations and construction which may be readily non-destructively tested by the present device and process.

Generally, a container 11 will include opposed ends. One end 12 may be open and the other end 13 may be closed as by a lid or other appropriate closure. Alternatively, the container may include opposed open ends as where a can is to be tested prior to placement of a lid 14 or lids to complete and seal the container and its contents. The device and processes disclosed herein will function equally to test either configuration or portions thereof.

The surfaces to be tested may be considered at any point along the container whether it be along the side walls, at a seam 19, or along the lid 14. Also, the surfaces to be tested may be the entire interior configuration of the container and the entire exterior configuration.

Figure 8:
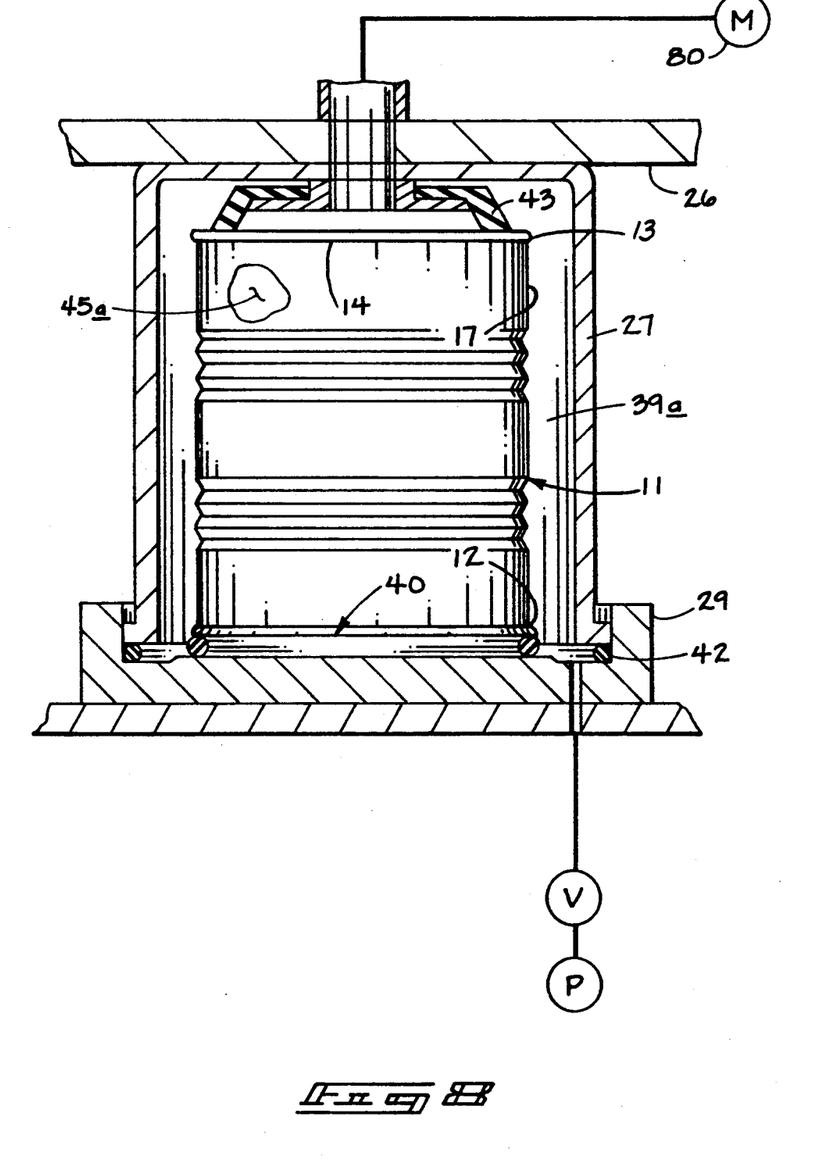
FIG. 8 is a fragmented sectional view illustrating an alternative sealing arrangement.
Figures 9, 10, 11:
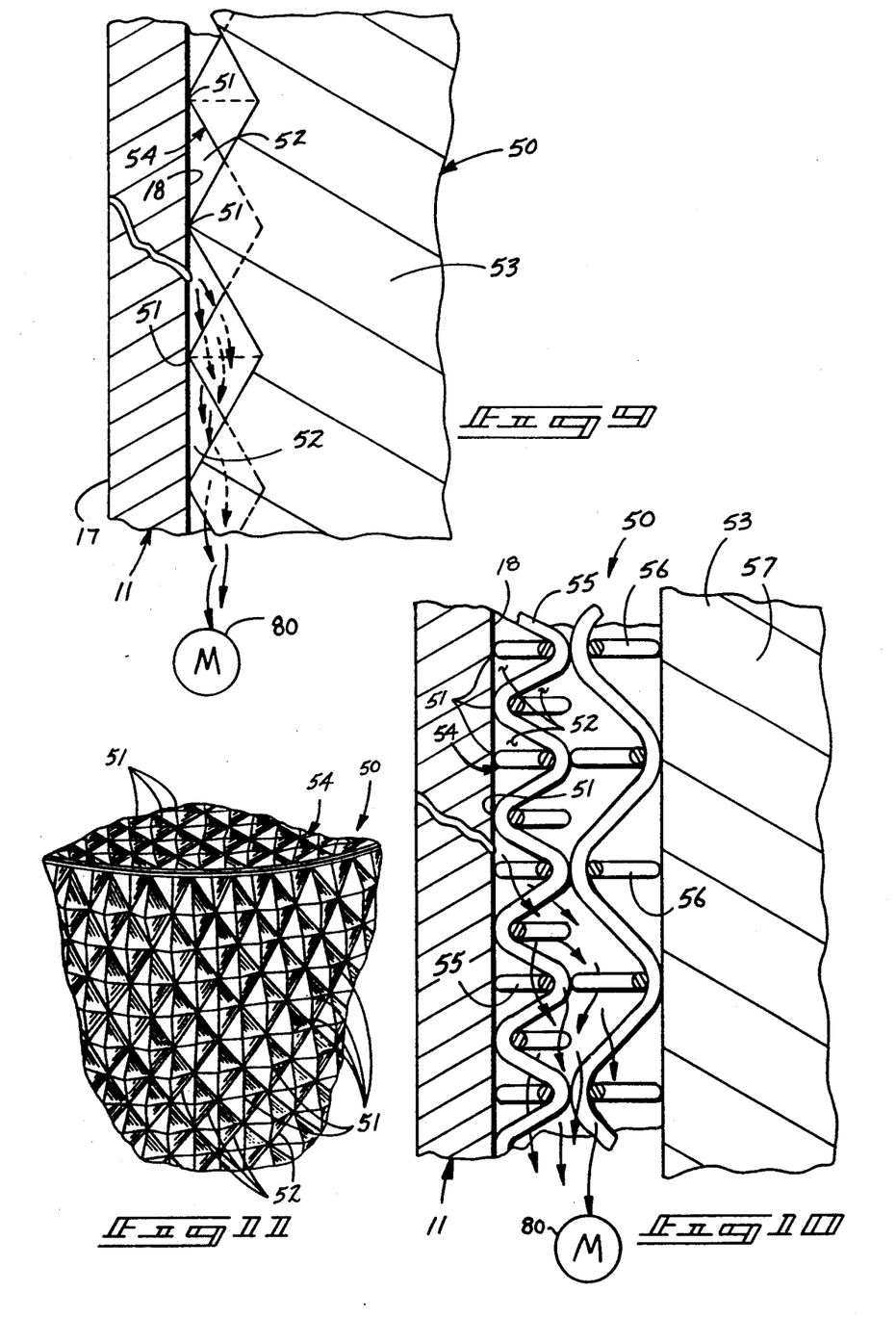
FIG. 9 is an enlarged fragmented diagrammatic view illustrating an alternate knurled support against a container surface and a leak through the container.
FIG. 10 is a view similar to FIG. 9 only showing the preferred support configuration.
FIG. 11 is a fragmented diagrammatic view of the alternate textured support shown in FIG. 9.
Figure 11:
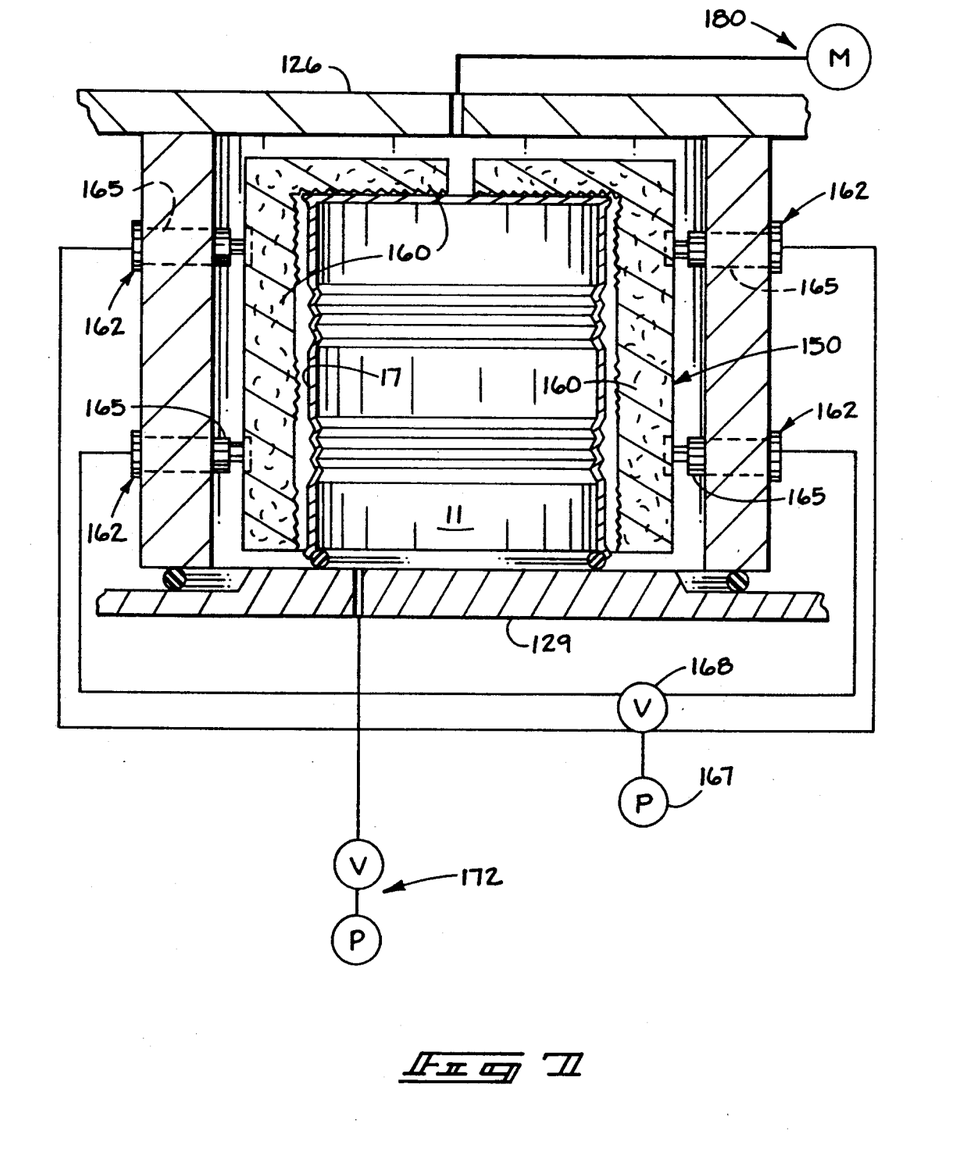

A first preferred form of the present device 10 is exemplified in FIGS. 1 through 5. Details of a preferred support surface are shown in FIG. 10. An alternate form is shown in FIGS. 6 and 7, while variations and details of construction are shown in FIGS. 8, 9 and 11.

In general, the present device 10 includes a frame 24. Frame 24 supports a test head 25 for releasably receiving the container 11 to be tested. More specifically, the test head 25 includes a first container receiver member 26 on the test frame. In a preferred embodiment, member 26 includes a downwardly open receptacle 27 for loosely receiving a container 11. The first container receiver 26 and receptacle 27 are slidably mounted to upright guideposts 32. A means 33 is provided for moving the container receiving members 26, 29 together and apart between open (FIG. 1) and closed (FIG. 2) positions. Test head 25 also includes a second container receiver 29 which will be described in greater detail below. The open position of the members is also shown by dashed lines in FIG. 2. The container receiver members may be selectively closed by means 33 to enclose and seal a container therein for testing procedures described below.

Figure 1:
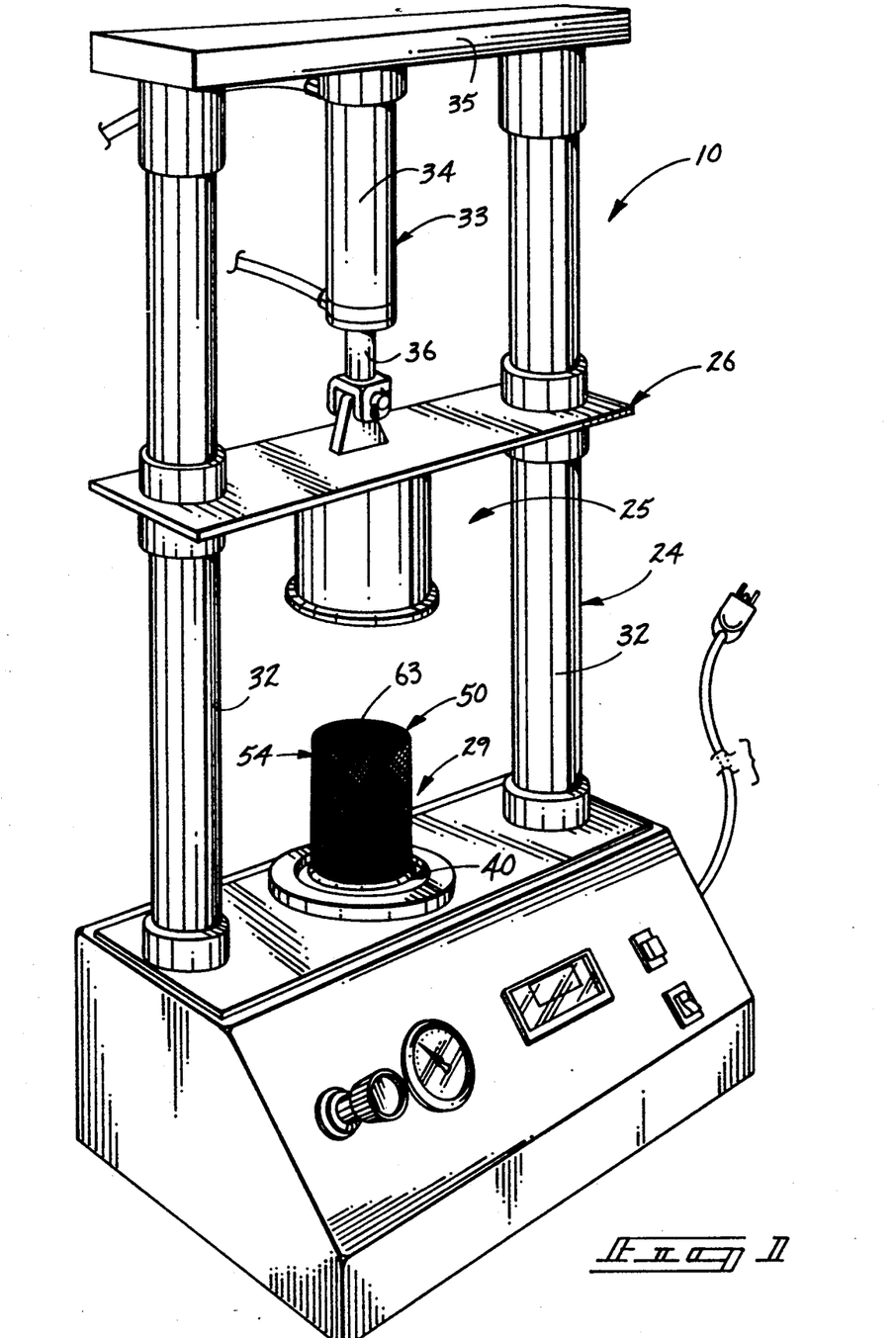
FIG. 1 is a perspective view of a preferred embodiment of the present invention showing the container receiving members thereof in an open condition.
Figure 2:
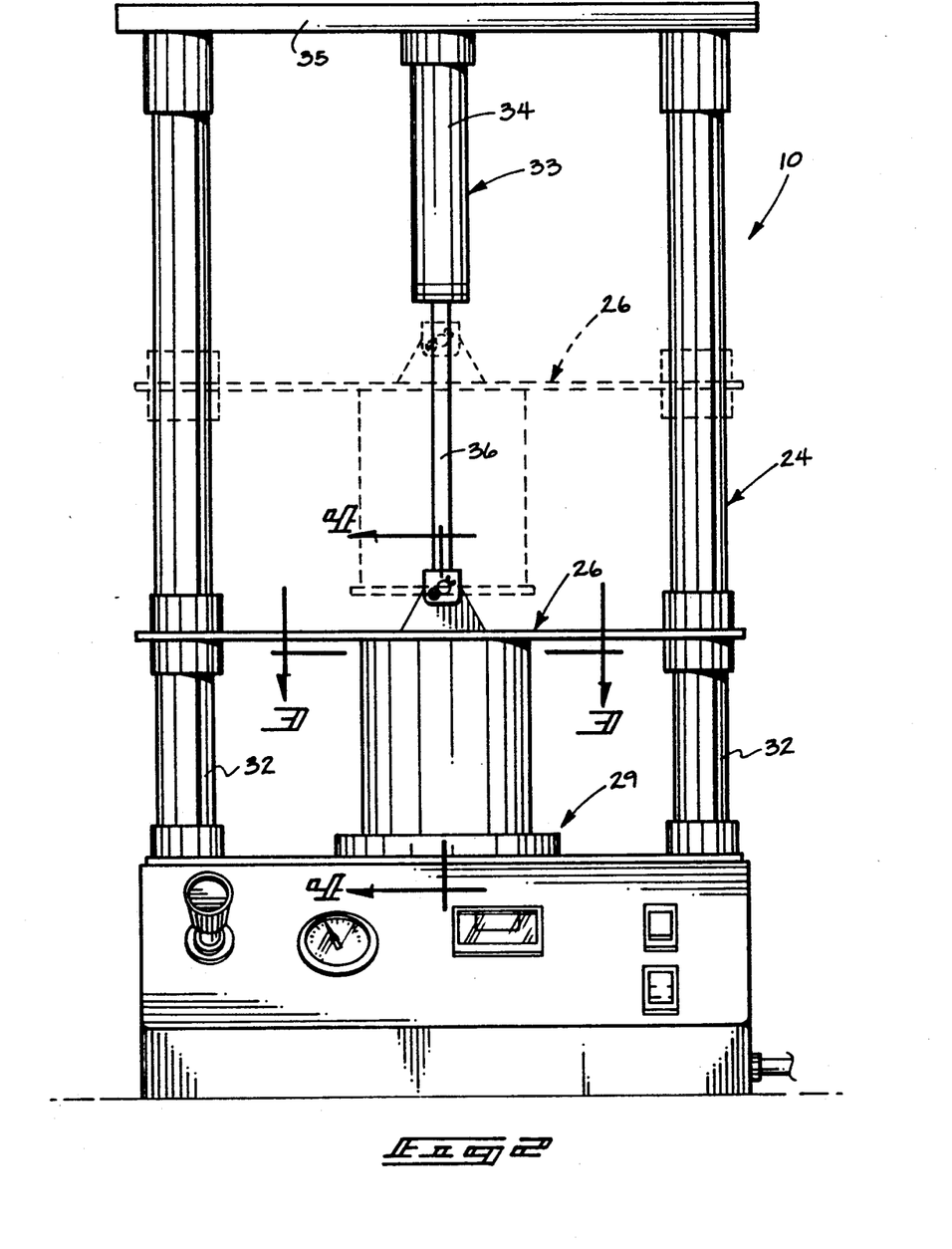
FIG. 2 is a frontal elevation view showing the container receiving members in a closed condition.

Means 33 is comprised of an upright cylinder 34 mounted to a cross head 35. Cross head 35 is secured to the upright guideposts 32. Cross head 35 includes a piston shaft 36 extending from the cylinder body to connect with the second container receiver 29. Extension and retraction of cylinder 34 will therefore cause corresponding movement of the container receiver 26 between the open and closed conditions. Appropriate pump and control mechanisms may be provided that are well-known in the art to accomplish this function.

Figures 3, 4:
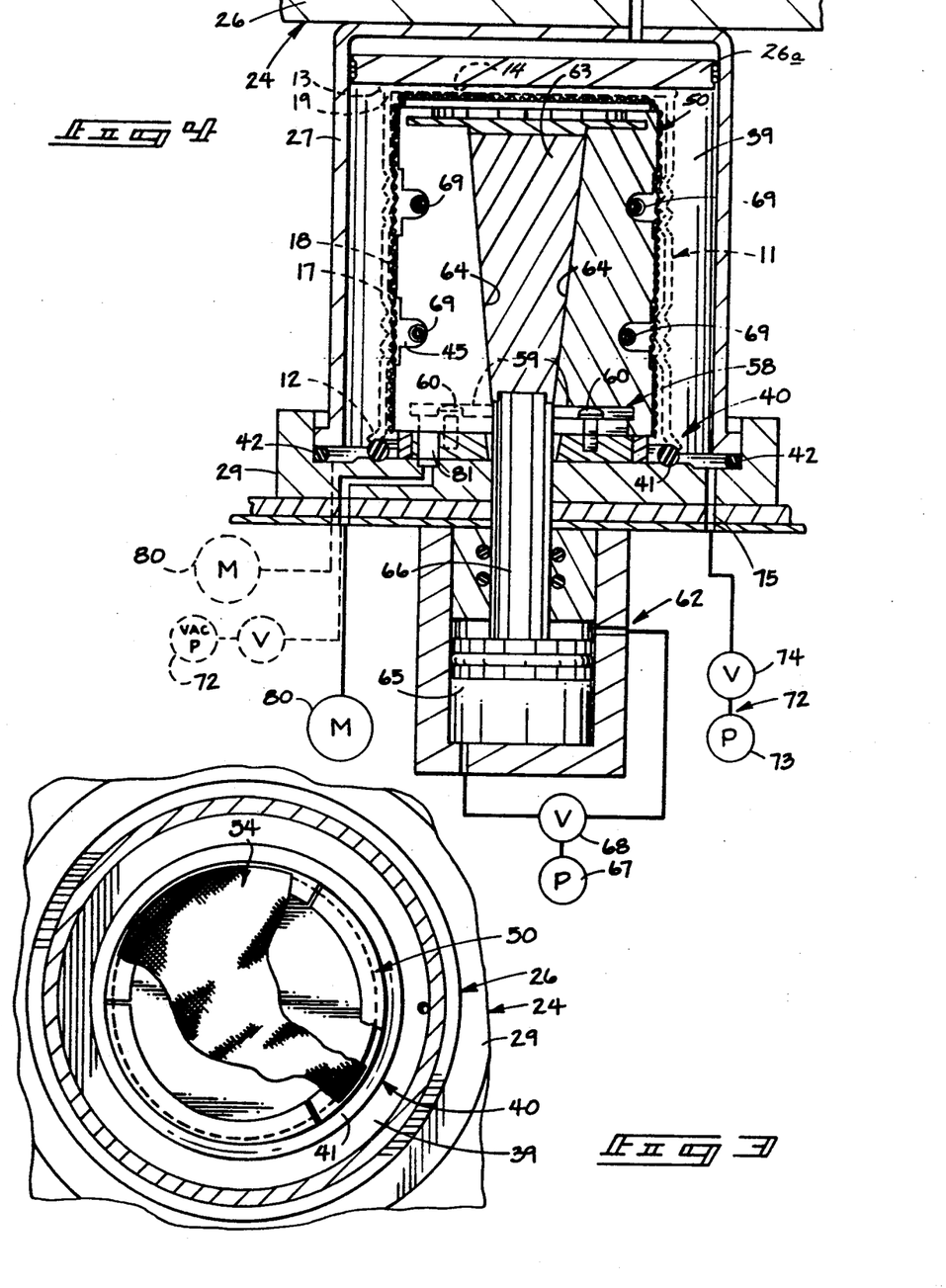
FIG. 3 is an enlarged sectional view taken substantially along line 3—3 in FIG. 2.
FIG. 4 is an enlarged fragmented sectional view taken substantially along line 4—4 in FIG. 2.
Figure 5:
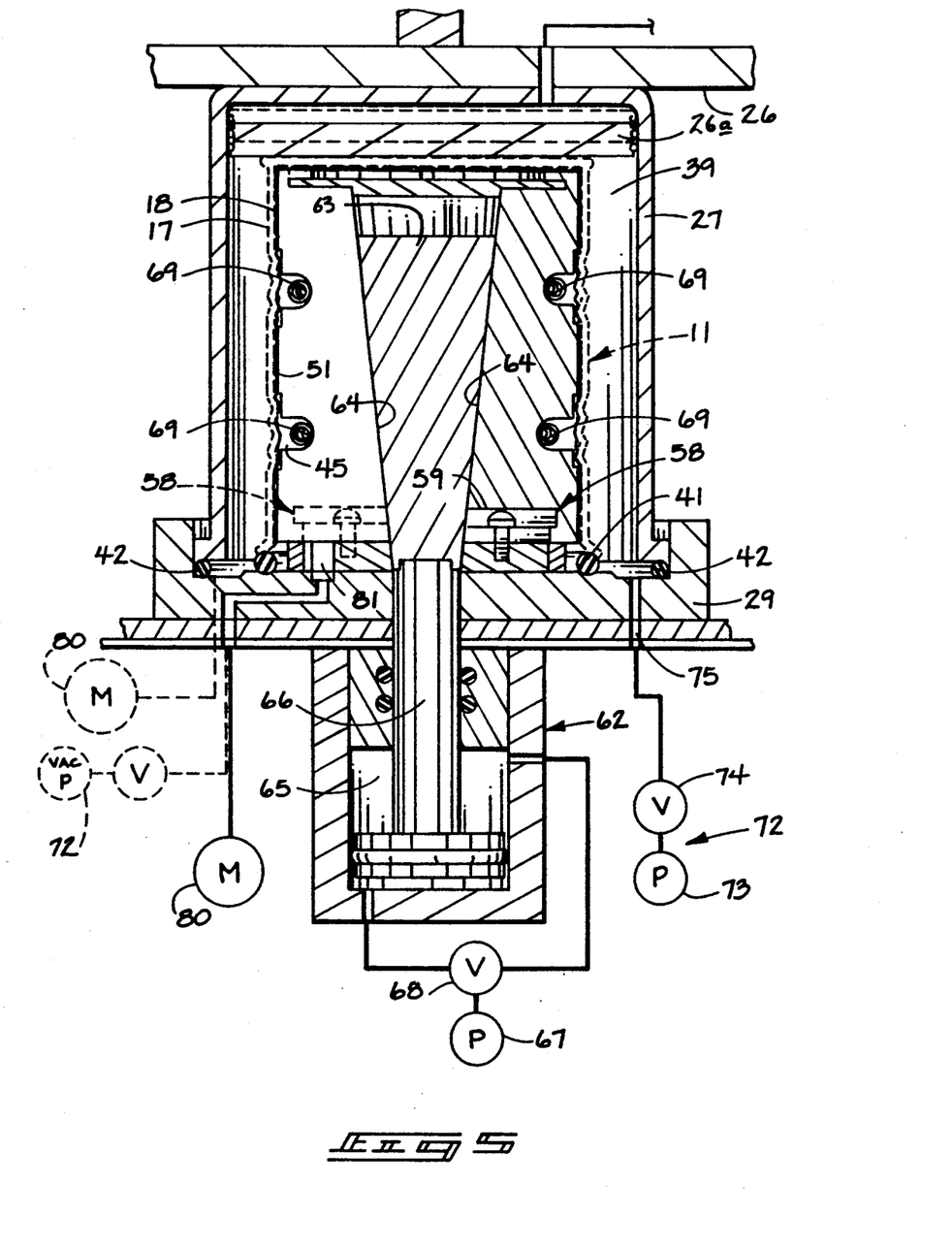
FIG. 5 is a view similar to FIG. 4 only showing the support therein in an expanded, container engaging position.
Figure 6:
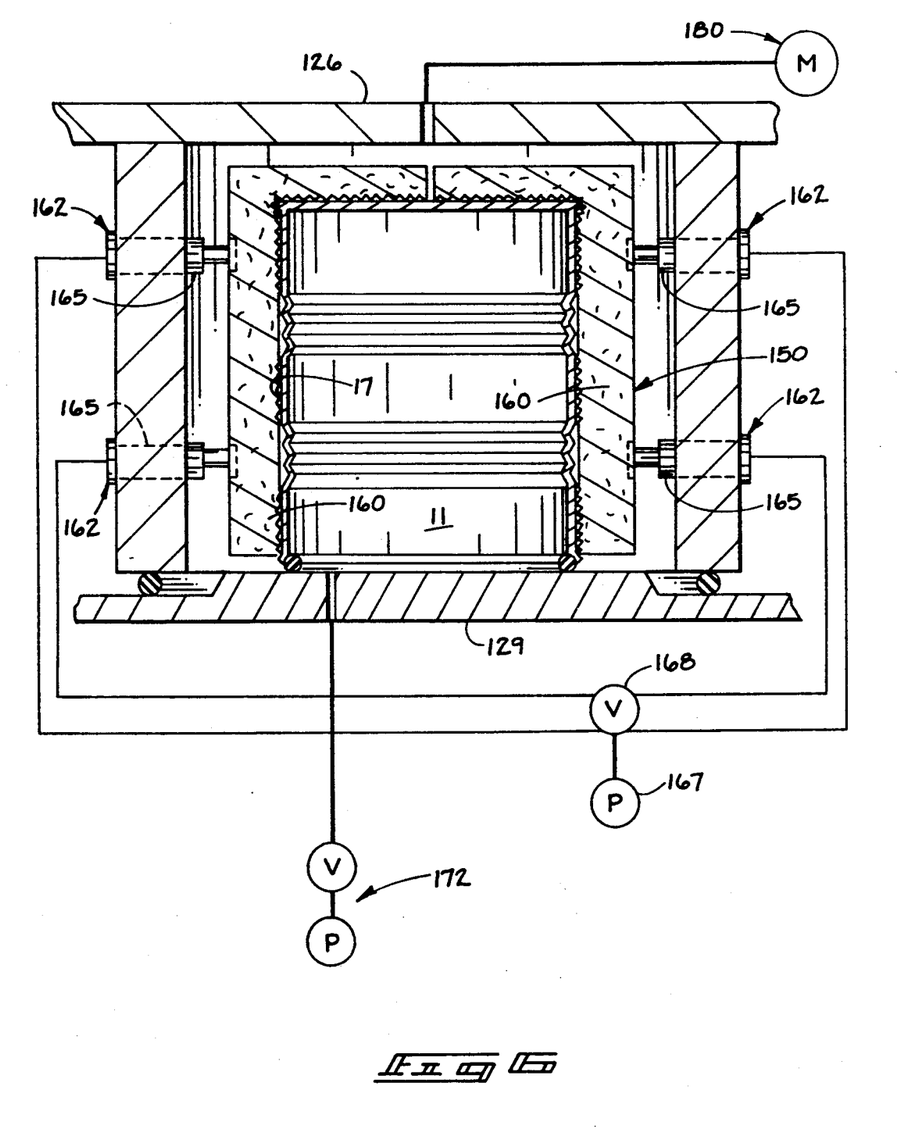
FIG. 6 is a fragmented sectional view of an alternative form of the present testing apparatus.

The fragmented views of FIGS. 3–5 exemplify a seal means 40 that is used to define a first sealed chamber or test chamber 39 within the enclosure between the container receiver members 26, 29. As shown, the chamber 39 circumscribes the external surface 17 of the container.

Seal means 40 advantageously also defines a second sealed chamber or reaction chamber 45 within the enclosure along surface 18 of the container directly opposite to the container surface presented to the test chamber 39.

More specifically, the seal means 40 may be comprised of a first O-ring seal 41 mounted to the second container receiver 29. The first O-ring seal is shaped to engage and seal against the open end 12 of a container, thereby sealing the inward container surfaces from the outward surfaces.

Seal means 40 may also include a second seal 42. This seal is positioned along the second container receiver 29 and is in the shape of an O-ring, concentric with and spaced outwardly of the first seal 41. The second seal 42 is positioned to be engaged between the container receptacle 27 and the first container receiver member 26. Thus, when the container receiver members are moved to the closed condition as shown in FIG. 4, the sealed test chamber 39 is defined between the receptacle 27 of the first member 26, the second receiver 29, the seals 41, 42, and the external outward surface 17 of the container. In the first preferred form, the volume contained within this area is considered to be the test chamber.

An alternative, optional third seal 43 may be provided on the first container receiver member 26. This seal 43 is shown in FIG. 8 engaging the top or closed end 13 of a container. This seal may be utilized with any of the inward or outward support forms described below when it is not desired to test the adjacent end of the container. As a further alternative, the seal 43 may also be utilized to engage and seal against an open-ended container (not shown) having both ends open (without a lid 14.) In this configuration, a sealed chamber 39a may be defined by the first container receptacle 27, the second receiver member 29, the seals 41, 42, and the exposed outward surface 17 of the container between seals 41 and 43. In this configuration a chamber 45a, if desired, would exist between the seals 41 and 43 and between the receiver members 26, 29 along with the inwardly facing surfaces of the container. Either of the chambers could be considered a test chamber, depending on the location of container engaging supports (FIGS. 4–7) that will be described in detail below.

It may be noted that the above-identified seals become complete when a container is received by the device and the container receiving members have been moved to their closed conditions.

To aid this action, a pressure-assisted closure plate 26a (FIGS. 4, 5) is slidably mounted within the first container receptacle 27. Pressure applied above the slidable plate may be used to press the plate downwardly against the container to force the container downwardly against the seal 41. Subsequently applied testing pressure within the enclosure may be sufficient to overcome the pressure above the plate 26a, and thereby force the plate upward and allow access to the container lid area for testing.

It may also be noted that the seal means may be otherwise situated between the container receiving members. For example, the second seal or "O"-ring 42 could be mounted as easily to the bottom surface of the container receptacle 27. The "O" ring 42 would then be situated on the bottom rim of the receptacle to engage flush against the second container receiver member when the two receivers are moved to their closed condition. Likewise, the first seal 41 could be positioned to engage the container at other selected positions along the container surfaces. Similarly, the third seal 43 can be otherwise positioned as desired to engage and seal the first container receiver member against the desired container surface.

An important feature of the present invention is a support 50 on the testing head for engaging the selected test area of the container. Support 50 is provided to buttress the engaged container surface against deformation or collapse under pressure, and to permit passage of differentially pressurized fluids through any leaks that happen to be in the container surfaces being tested.

To this end, the support generally includes a network of container engaging support surfaces 51 (FIGS. 9–11) and interspersed open fluid passages 52. The support surfaces 51 are provided to engage and secure adjacent surfaces of the test container, while the passages 52 permit free reception and transmission of test fluid received through the container from any leaks contained therein. The support surfaces 51 and fluid passages 52 are closely spaced and conform to the shape of the container surface to be tested.

The preferred support 50 includes a rigid base 53 having an external surface including the support surfaces 51 and passages 52. The external surface of the support mounts a textured surface 54 for receiving and engaging the inward facing surface 18 of the container being tested. In an example where a can is being tested, the base 53 will take the form of a cylindrical construction (FIGS. 1, 3) to conform with the internal substantially cylindrical configuration of the container interior. The textured surface 54 will appear along the surfaces of the support that face the mating surfaces of the container.

A first preferred configuration of the textured surface 54 includes a removable screen 55 that defines the textured support surfaces 51 as strands of the screen and the fluid passages 52 as the spaces between the woven strands. It is preferred that the screen be a microporous screen formed by wire strands or by sintered metal, with a mesh size ranging according to the gauge and strength of the container wall being tested. A screen with mesh openings of approximately 20 microns has been found useful for testing rigid wall containers such as retail food storage containers, medical supply containers, toxic waste containers and the like. Larger size openings and screen strands are useful for containers with similarly increased wall thickness dimensions, such as, say, vats or storage drums. Conversely, a smaller mesh size and screen strand is beneficial in testing thin wall, less rigid containers such as flexible plastic food storage cups, bowls, or pouches or bags and the like.

The screen 55 may be spaced from the rigid base 57 by a secondary screen 56. The weave or mesh size of the secondary screen 56 may be somewhat wider than the weave of screen 55. This facilitates free travel of escaping fluids and the accompanying ability to quickly detect the presence of a leak.

Differentially pressurized fluid escaping through the leak will first escape through the open mesh of screen 55. Here, the weave or mesh is finer, so spacing between the portions of the woven strands engaging the container acting as support surfaces provide maximum support for the engaged container surfaces. The small openings interspersed between the screen strands, readily and freely receive any leaking differentially pressurized fluids. The received fluids will pass freely from the small screen 55 into the larger more porous second screen 56 and, hence, will dissipate quickly and readily to facilitate the testing procedure.

The screen surface is preferred, as it may be easily removed for cleaning or replacement and since the weave presents smooth bends which engage the container at very small tangential points of contact. Such minimal tangential contact is not likely to obstruct a leak and adversely affect the test procedure.

A second preferred form of textured surface 54 is "knurling" as identified in FIGS. 9 and 11. The knurling is formed, in one example, by a machining process by which an interlaced network of ridges and valleys are imprinted by known processes on the support surface. The elevated or ridge areas become the support surfaces 51 while the interlaced valleys become the open passages 52.

With the knurled configuration, the points (support surfaces 51) of the knurling separate the passages 52 (valleys) which are otherwise joined freely to one another to assist transmission or dissipation of any leaking fluid passing through the engaged container.

Another form of the textured surface may include supports that are formed of a rigid microporous material, such as shown diagrammatically in FIGS. 6 and 7. Such microporous supports may take the overall shape of the surface being tested. Also, the supports may selectively be shaped to conform to and engage either an interior surface of a tested article, an exterior surface, or both surfaces for test purposes. The surfaces and pores may be formed by known powdered metallurgy methods. Contact with the test article and escape of test fluids through the microporous material will occur in a manner similar to that described above for the screen surface. The pore size, like the screen size and knurling size, may be selected according to the nature of the material and thickness being tested.

It should be noted that the upward surfaces of the support sections may be provided with the textured surfaces (screened, knurled, microporous, etc.) to facilitate testing of the closed container end. Thus, the textured surface described above may be utilized about the entire perimeter or exposed surfaces of the support for testing purposes.

In any of the above support configurations, it is advantageous that the total surface area spanned by the exposed open ends of the passageways 52 be substantially larger than the surface area of the container engaged by the support surfaces 51. This relationship is important to minimize the chance that one of the support surfaces will engage and plug a leak in a container that was otherwise intended to be detected during the testing procedures described below. This relationship is diagrammatically illustrated in FIGS. 10 and 9 where small arrows identify the flow of a test fluid through the support passages 52. The leaking fluid is able to dissipate readily about the surface of the support and therefore is readily detected. A fluid escaping through a leak in the container, will therefore not be trapped against the container in an intestable location, but will instead enter the passages and quickly effect a pressure change in the adjacent area of the test head.

Means as provided at 62 (FIGS. 4 and 5) for selectively expanding and contracting the support of the first preferred form. The support is contracted to an inoperative condition to facilitate receiving and releasing a container therefrom. The support is expandable to an operative condition in order to bring the support surfaces 51 into firm contact with adjacent surfaces of the container for testing purposes to buttress the container against collapse and to present the passages 52 to readily receive any test fluid leaking through the container. The apparatus for selectively moving the support between these positions is exemplified in FIGS. 4 and 5.

In order to facilitate expansion and contraction, the support is provided in separable sections (FIG. 3), each having an inwardly facing conical cam surface 64. These surfaces mate with a conical cam 63. The cam 63 is mounted to the plunger piston shaft 66 of a ram cylinder 65. A conventional pump 67 or other appropriate pressure source and valve 68 are provided to selectively shift the conical cam 63 vertically against the cam surfaces of the support sections. The vertically moving cam, in turn, causes the support sections to expand and contract radially (FIGS. 4, 5). Retention springs 69 are provided to return the support sections to a retracted condition upon extension of the cam (FIG. 4).

Means is provided at 58 for movably mounting the support to the frame 24 for movement between the extended and the retracted positions. Such means 58 may be provided in the form of open radial slots 59 provided in the bottom of each support section. The slots receive headed studs 60 mounted in the second receiver frame member 29. Headed ends of the studs 60 are slidably received within the slots to hold the sections against movement elevationally, but will permit substantial radial expansion and contraction movement of the sections relative to one another and to the central axis of the conical cam 63.

A differential pressurizing means 72 is provided for applying a differential pressure within the test chamber against the container test area to produce seepage of fluid through a leak if present in the test area and into the open fluid passages of the support. The differential pressurizing means may be comprised of appropriate pump and valving mechanisms as generally shown at 73 and 74 in the drawings. They may be connected by appropriate passages 75 formed through the test head and opening into appropriate areas defining a test chamber or first sealed chamber in order to apply pressure differential thereto. It should be pointed out that the differential pressuring means may alternatively be a pump for supplying fluid under pressure to the test area, or it may be a vacuum arrangement (dashed lines, FIGS. 4, 5) for evacuating fluid from the test area in order to produce the desired pressure differential. Preferably, a pump is used and a positive pressure is applied to the test chamber area in order to produce a desired pressure differential across the container from the test chamber to the opposite side surface of the container.

A detecting means 80 is provided, connected to one of the sealed chambers (the test chamber or reaction chamber) to sense flow of fluid through a leak if present in the container responsive to application of differential pressure within the chambers by pressurizing means 72. Means 80 may employ an appropriate conventional sensor 81 mounted to the frame 24 and exposed to one of the chambers. Preferably the sensor is a conventional, known form of fluid pressure detector, of selected sensitivity to detect minute pressure changes in the adjacent chamber. Such a detector may be placed either in the test chamber to detect pressure change responsive to a container leak. Preferably, however, the detector is positioned within the reaction or second chamber for this purpose, especially where the differential pressure means is used to deliver a fluid such as air into the first chamber (test chamber) to positively pressurize the chamber against the exposed surface of the container.

An alternate embodiment of the present invention is illustrated in FIGS. 6 and 7. Here, separable first and second container receiver members 126, 129 include a contractible support 150 for movement between an operative condition (FIG. 6) engaging the external or outward surfaces 17 of the container to be tested, and an inoperative condition to facilitate disengagement of the container. The support 150 may be mounted to the first container receiver member 126 for movement relative to the second container receiver 129 between open and closed configurations using a cylinder and guide arrangement (not shown) substantially identical to the cylinder 34 and guides 32 shown in FIGS. 1 and 2.

The support 150 may include any of the above-disclosed inwardly facing textured surfaces with appropriate support surfaces and passages, as those described in relation to FIGS. 9-11 or the microporous material shown in FIGS. 6 and 7. The support is rigid, along with the support surfaces thereon to engage and buttress the external surfaces 17 of the container against distortion such as bursting or collapsing pressures that may be exerted during the testing procedures.

The support may be provided in radially separable sections 160 and may be moved between a radially expanded (inoperable) condition and contracted (operative) condition by an appropriate means 162. As an example, means 162 may be provided in the form of a plurality of radially oriented cylinders 165. These cylinders may be connected to a common source of fluid under pressure such as a pump 167 or other pressure source and a conventional valving arrangement 168. Actuation of the pump 167 and valve 168 will extend the cylinders, causing the support sections to contract radially inward to the operative condition against adjacent surfaces of a container to be tested. The valve and pump may also be selectively operated to cause these cylinders to contract. This action will cause the support sections to move radially outward to the inoperative condition, away from one another, to facilitate insertion or removal of container over the surfaces. The support may therefore expand to an open condition in which the container to be tested is readily received or released.

The alternate embodiment includes operating mechanisms such as a differential pressure means 172 and detection means 180 that may be substantially identical to the means 72 and 80 described above.

It should be noted that the support configuration shown in FIGS. 6 and 7 includes surfaces for engaging the external wall surfaces of the container and the closed end 13 thereof. It is to be understood, however, that the portions of the support engaging a closed container end could be removed. A third seal such as the third seal 43 shown in FIG. 8 may be substituted in case of can blanks being tested wherein both ends of the can blanks are to be left open.

The novel processes involved with the present invention may best be understood in terms of operation of the apparatus as described above.

In general, the novel testing process described herein involves the basic steps of:
1. Engaging a selected are of the container to be tested against the support;
2. Producing a pressure differential across the opposed surfaces of the container member; and
3. Detecting the differential pressure change responsive to flow of fluid through the container into the fluid passages of the support in response to transfer of fluid pressure through a leak, if present, in the tested portion of the container.

More specifically, the process, and operation of the present apparatus disclosed above, first involved the step of opening the container receiving members to the open condition. This facilitates insertion of a container. In the preferred embodiment, the container is placed over the internal support configuration shown in FIGS. 1 and 4, 5. This step is accomplished with the support in its retracted condition.

The support is moved to the retracted position by actuation of the cylinder 65 to extend. The cylinder elevates the cam 63 and allows the support sections to contract due to the compressive strength of the springs 69. The external circumference of the support thereby contracts, allowing the container to be freely received axially thereover.

Next, the two container receiver members 26, 29 are closed. This is done by actuating the cylinder 34 to extend, lowering the container receiver 27 over the mating container receiver area 30 and joining the appropriate seals to one another thereby forming the sealed test chamber or first sealed chamber outwardly of the external areas of the container to be tested.

In the preferred embodiment, the test area includes the entire exposed surface of the container including the sides and closed end. However, depending upon the orientation of the various seals, other more confined areas or portions of the container may be tested as well.

The pressure assisted closure plate functions as the receiving members close to yieldably engage the container top end and urge the container downwardly against the seal 41. The pressure assist above the plate may be approximately 20 psi for this purpose.

As the container receiving members come together the seals are completed, the means 62 for expanding and contracting the support is actuated to cause the support to expand and engage the inwardly facing surfaces of the container. The support surfaces and passages of the support are thus brought into operative positions with the supports engaging the container surfaces and with the fluid passages situated immediately adjacent to the surfaces for receiving any seepage of fluid through a leak in the container surface being tested.

Differential pressurization of the test chamber or first sealed chamber is accomplished following closing of the two container receiver members 26, 29 to act against the seals and thereby produce the sealed test area. This happens whether the seals are arranged in the preferred configuration shown in FIGS. 4 and 5, or the alternative arrangement shown in FIG. 8. The seals come together as the two container receiver members are closed.

With the first sealed chamber thus established, pressure differential may be applied. As preferred, the pressure differential is applied by selectively pressurizing the sealed test chamber. In response, the surface of the container facing the testing chamber is exposed to the applied fluid pressure. Of course the tendency is for the container surface to move away from the applied pressure. However, the expanded support buttresses the container from the opposite engaged inward surface and will not allow the container to deform in response to the applied pressure.

A positive pressure of approximately 150 p.s.i. or more has been found to be successful using ordinary air as the pressure fluid for testing purposes. This pressure, used with conventional metal can construction, will effectively result in detection of leaks within a very short period of time. Such pressurization, without the provision of the present support arrangement would ordinarily seriously deform the tested surface, even of a metal can.

The positive pressure (150 psi) also has the effect of overcoming the pressure behind the plate 26a and forcing the plate to move upwardly from contact with the container end. This exposes the container end to the testing pressure.

The test pressure is brought to a prescribed level and is held within the test chamber. The detecting means of standard configuration is provided to determine a change in pressure differential between the opposed side surfaces of the tested container area. As stated above, any of several conventional forms of pressure detecting monitors 81 may be utilized. However, it is preferred that a pressure detection monitor be placed within an established second chamber or reaction chamber inwardly of the first seal 41. Seepage of fluid through a leak in the tested container surface will be dispersed through the network of support fluid passages 52, quickly altering the pressure within the reaction chamber. This pressure change is detected by the monitor which, in turn, is used to produce a signal identifying the container as being defective.

Alternatively, the detecting means may also be supplied as a pressure sensor within the test chamber. In this situation, the pressure within the test chamber would be brought to a selected level by the differential pressurizing means. Application of the differential pressure would then be cut off after the prescribed level has been reached. The monitor would then detect any pressure depletion due to seepage of fluid through a leak in the tested container surface. With this arrangement, no particular sealed reaction chamber is required. However, the preferred arrangement includes a reaction chamber since a leak into such a chamber results in a pressure change that may be detected more quickly.

Operation and novel process steps involving use of the outside support 150 (FIGS. 6 and 7) may be accomplished in a manner substantially similar to the preferred arrangement described above. Firstly, the container receiver members 126, 129 are separated to facilitate insertion of a container between the two members. The members are then closed to enclose the container and to complete the seals between the container and receiver members to establish the test chamber which, in this configuration, is situated outwardly of the container. The reaction chamber, if provided, is situated adjacent the inwardly facing surfaces of the container.

Once the container receiver members 126, 129 have closed, and the seals have been completed, the means 162 for expanding and contracting the external support 150 is activated to close or contract the support sections 160 against the desired areas of the container to be tested. The support surfaces therefore come into to contact with the external test areas of the container and the passageways come into close proximity with the outward container surfaces.

The internal test chamber is then differentially pressurized. Preferably, the differential pressurizing means 172 functions to pump a fluid such as air into the internal test chamber. The pressurized fluid will pass through a leak, if present, from the internal surfaces through the container to the external surface. The seeping fluid will then be received within the open network fluid passageways of the support and will affect a pressure change within the external reaction chamber. This will cause a change of pressure within the reaction chamber which may be detected by an appropriate pressure detector monitor 180 as shown in FIG. 6. Alternatively, the pressure detection monitor 180 may be provided to detect a pressure drop within the test chamber as described above. So this would eliminate the need for an external, sealed reaction chamber and, instead, would rely upon a detected change in the test chamber pressure responsive to seepage of differentially pressurized fluid through a leak, if present, in the container.

The above configurations and novel processes describe a container member testing apparatus and technique that facilitates extremely fast and accurate testing of selected containers or container components. The pressure differential applied in the testing process may be substantially high, whether utilizing vacuum pressure, positive pressure, or a combination of both. The high operating test pressures will facilitate detection of relatively minute leaks in the tested container components at a high rate of speed. Testing speed may be further enhanced by using particular testing fluids having smaller molecular structure and that will pass more freely through smaller leaks. Helium, for example, will more freely move through a small leak than will ordinary air. Thus, selection of the test fluid may be made according to the test requirements.

Operating pressures for the differential pressure application means may be also be selectively varied according to the container article or surfaces being tested. The pressure differential, however, may be substantially higher than those pressures previously utilized for leak testing due to the provision of the support and the network of support surfaces and interspersed fluid passages. The rigid support surface will prevent deformation of the pressurized or differentially pressurized container surface while the open fluid passages will transmit any seeping fluid, thereby permitting a relatively free flow of pressurized fluid through any leaks in the container. Such seepage will quickly become detectable using appropriate differential pressure sensing monitors as described.

Testing for leaks using the above-described apparatus and novel processes may be completed in sufficiently short order to facilitate positioning of the test apparatus along an assembly line to facilitate testing of individual containers as they are formed. Thus, the present invention enables reliable testing of containers being formed and essentially eliminates the need for random testing of samples as previously required due to slower testing procedures.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A container testing apparatus for applying a differential pressure to a container to aid in detecting leaks therein, said container including outward and inward surfaces, comprising:
   a frame;
   a testing head on the frame;
   seal means defining a test chamber for sealed contact with a selected test area on one of the container surfaces;
   a contractible support means having a network of (a) member engaging support surfaces positioned against a rigid base for releasably engaging and rigidly supporting the member along one of its opposed surfaces against deflection in a direction toward the one surface and (b) open fluid passages interspersed with the support surfaces for receiving and transmitting fluid away from the one member surface;
   wherein the contractible support means is provided on the testing head for movement between an operative condition to engage the selected test area of the container and buttress the selected test area against deformation responsive to applied differential pressure, and an inoperative condition to facilitate disengagement of the container;
   differential pressurizing means for applying a differential fluid pressure within the test chamber against the container test area to produce seepage of fluid through a leak if present in the test area and into the open fluid passages; and
   detecting means on the frame for sensing flow of fluid through the fluid passages from seepage through a leak in the container.

2. The container testing apparatus of claim 1 wherein the container has a hollow configuration such as a can or bowl with inward and outward wall surfaces and wherein the contractible support means is shaped in a rigid configuration to conform to and receive one of the wall surfaces.

3. The container testing apparatus of claim 2 wherein the test chamber is formed in the test head to receive the outside of the outward wall surface.

4. The container testing apparatus of claim 3 wherein the support is shaped to receive the inward wall surface of the container and the differential pressurizing means is connected to the test chamber for delivering a fluid under positive pressure to the test chamber and against the outward wall surface of the container test area.

5. The container testing apparatus of claim 2 wherein the test chamber is formed in the test head to receive the inward container surface.

6. The container testing apparatus of claim 5 wherein the contractible support means is shaped to receive the outward wall surface of the container and the differential pressurizing means is connected to the test chamber for delivering a fluid under pressure to the test chamber and against the inward wall surface of the test area of the container.

7. The container testing apparatus of claim 1 wherein the test head includes a reaction chamber adapted to receive a side of the container test area opposite the test chamber.

8. The container testing apparatus of claim 7 wherein the detecting means is connected to the reaction chamber for sensing pressure change therein.

9. The container testing apparatus of claim 8 wherein the contractible support means is situated within the reaction chamber and the fluid passages openly communicate with the reaction chamber.

10. The container testing apparatus of claim 7 wherein the contractible support means is situated within the reaction chamber and the fluid passages openly communicate with the reaction chamber.

11. The container testing apparatus of claim 7 wherein the container has a hollow substantially semi-cylindrical configuration such as a can or bowl with inward and outward wall surfaces and wherein the contractible support means is shaped to conform to and receive one of the wall surfaces.

12. The container testing apparatus of claim 11 wherein the test chamber is formed in the test head to the outside of the outward container surface.

13. The container testing apparatus of claim 12 wherein the contractible support means is shaped to receive the inward wall surface of the container and the differential pressurizing means is connected to the test chamber for delivering a fluid under positive pressure to the test chamber and against the outward wall surface of the container test area.

14. The container testing apparatus of claim 11 wherein the test chamber is formed in the test head to receive the inside of the inward container surface.

15. The container testing apparatus of claim 14 wherein the contractible support means is shaped to receive the outward wall surface of the container and the differential pressurizing means is connected to the test chamber for delivering a fluid under pressure to the test chamber and against the inward wall surface of the test area of the container.

16. The container testing apparatus of claim 1 wherein the member engaging support surfaces are formed by a screen defining the network of container engaging surfaces and open passages and wherein the screen is shaped against the rigid base to receive the inward wall surface of the container to buttress the container against differential pressure applied thereto and to transmit differentially pressurized fluid pressure from a leak through the container, away from the inward container wall surface by way of said fluid passages.

17. The container testing apparatus of claim 1 wherein the container has a hollow substantially semi-cylindrical configuration such as a can or bowl with inward and outward wall surfaces; and wherein the network of support surfaces and open fluid passages is formed by a screen shaped against the rigid base to conform to and receive the outward wall surface of the container to buttress the container against differential pressure applied thereto and to dissipate differentially pressurized fluid flowing through a leak in the container away from the outward container wall surface.

18. Apparatus for testing for leaks along a member such as a container wall having opposed surfaces, comprising:

a contractible support means having a network of (a) member engaging support surfaces positioned against a rigid base for releasably engaging and rigidly supporting the member along one of its opposed surfaces against deflection in a direction toward the one surface and (b) open fluid passages interspersed with the support surfaces for receiving and transmitting fluid away from the one member surface; and differential pressure means for applying a fluid pressure against the member to produce a fluid flow through a leak if present in the member and into the network of fluid passages in the support; and detector means for sensing an effect associated with transmission of fluid through the leak.

19. The apparatus of claim 18 wherein the member is a wall of substantially circular cross section such as the peripheral wall of a can or bowl and includes inward and outward surfaces; and wherein the contractible support means is shaped to conform to the peripheral wall and further comprising;

means for selectively expanding and contracting the rigid base radially to alternatively securely engage the peripheral wall to buttress the peripheral wall against fluid pressure applied by said differential pressure means and to disengage the peripheral wall to facilitate application and removal of the member from the contractible support means.

20. The apparatus of claim 18 wherein the member engaging surfaces and fluid passages of the support are formed by a textured surface on the contractible support means.

21. The apparatus of claim 20 wherein the textured surface is comprised of a screen on the rigid base, including strands with raised surfaces forming the support surfaces and spaces between the strands forming the fluid passages.

22. The apparatus of claim 18 wherein the member engaging surfaces and fluid passages are formed by knurling on the base, with raised surfaces forming the support surfaces and recessed valleys between the raised surfaces forming the fluid passages.

23. The apparatus of claim 18 wherein the member engaging surfaces and fluid passages are formed of a rigid microporous material.

24. A process for detecting a leak through a member such as a container wall having opposed surface; comprising the steps of:

moving a contractible support means into an operative position engaging one surface of the member, the rigid contractible support means including a rigid base with a network of rigid interspersed member engaging surfaces and open fluid passages thereon;

producing a pressure differential across the opposed surface of the member so one of the opposed surfaces is urged by fluid pressure against and braced by the contractible support means against deformation and so that a leak, if present in the member, will seep through the member and into the network of open fluid passages;

detecting the flow of fluid through the open fluid passages; and moving the contractible support means into an inoperative position disengaged from the one surface of the member.

25. The process as defined by claim 24 wherein the step of producing a pressure differential between the opposed surface includes the steps of:

forming a sealed chamber against the member including at least a portion of a selected opposed surface of the member; and differentially pressurizing the sealed chamber to produce fluid flow through a leak if present in the member.

26. The process as defined by claim 25 wherein the step of producing a pressure differential includes the further step of securing a reaction chamber along the surface opposite the member surface with the sealed chamber formed thereagainst, to receive fluid seeping through the fluid passageways of the contractible support means responsive to application of the differential pressure.

27. The process as defined by claim 24 wherein the step of producing a pressure differential includes the further step of securing a reaction chamber along the surface opposite the one member surface to receive fluid seeping through the fluid passageways of the contractible support means responsive to application of differential pressure.

28. The process as defined by claim 24 wherein the step of producing a pressure differential is accomplished by directing a positive fluid pressure against the surface of the member opposite the one member surface engaged by the contractible support means.

29. The process as defined by claim 28 comprising the further step of forming a sealed chamber against the member to contain the positive fluid pressure directed against the member.

30. The process as defined by claim 29 comprising the further step of providing a reaction chamber opposite the sealed chamber and positioning the contractible support means on the one member surface so the open fluid passages open into the reaction chamber.

31. The process as defined by claim 30 wherein the step of detecting the flow of fluid through the open fluid passages includes detecting a pressure change in the reaction chamber responsive to seepage of fluid through the member and the open fluid passages from the positively pressurized sealed chamber.

32. A device for nondestructive leak testing of open containers having opposed inward and outward testable surfaces, the device comprising:

a frame;

a first container receiving member on the frame;

a second container receiving member on the frame, for mating engagement with the first container receiving member to enclose the container;

means for moving the first and second members apart to receive a container therebetween, and together to enclose the container;

seal means on the members for engaging and sealing against the container and for defining a first sealed chamber within the enclosure along the outward surface of the container and second sealed chamber within the enclosure along the opposed inward surface of the container;

differential pressure means for producing a differential fluid pressure in the chambers across the opposed inward and outward surfaces of the container, to effect fluid flow through a leak if present in the container from one chamber toward the other;

collapsible support means on one of the members including a rigid base rigidly mounting support surfaces for engaging and buttressing the container against the applied pressure differential and interspersed open fluid passages for permitting fluid flow therethrough between the chambers and means for selectively expanding and contracting the rigid base radially; and detector means for sensing an effect resulting from a leak through the container responsive to the applied pressure differential.

33. The device of claim 32 wherein the contractible support means is conformed to receive the inward surface of the container;
wherein the pressure differential is applied such that fluid pressure in the first chamber is relatively higher than fluid pressure in the second chamber.

34. The device of claim 32 wherein one of the container receiving members includes a container receiving receptacle and wherein the seal means includes a first seal for sealably engaging the container at an end thereof, and a second seal extending about the container receiving receptacle and spaced outwardly of the first seal;
the second seal being situated on one of the container receiving members for sealably engaging the remaining container member as the container members are moved together, defining the first sealed chamber between the first and second seals within the container receiving receptacle, and with the outward container surface exposed to the first chamber.

35. The device of claim 34 wherein the first seal, inward container surface and one of the container receiving members define the second sealed chamber.

36. The device of claim 34 wherein the first and second seals are annular and concentric.

37. The device of claim 34 further comprising a third seal on one of the members for engaging and sealing against the container at a position thereon spaced from the first seal so that the first chamber is defined between the first, second and third seals.

38. The device of claim 37 wherein the container includes opposed ends and wherein the first and third seals engage the container adjacent its opposite ends.

39. The device of claim 32 wherein the collapsible support means is conformed to receive the outward surface of the container;
wherein the pressure differential means selectively applies a fluid pressure differential across between the chambers such that fluid pressure in the second chamber is relatively higher than fluid pressure in the first chamber.

40. The device of claim 32 wherein the total surface area of the container engaged by the support surfaces is less than the total surface area of the container exposed to the openings of the fluid passages.

41. The device of claim 32 wherein the network of support surfaces and passages is formed by a screen formed over the rigid base.

42. The device of claim 32 wherein the network of support surfaces and passages is formed of a knurled surface on the rigid base.

43. The device of claim 32 wherein the rigid base is formed by a rigid microporous material.

* * * * *